(12) United States Patent
Eckholm et al.

(10) Patent No.: US 10,617,262 B2
(45) Date of Patent: Apr. 14, 2020

(54) CUTTING BOARD SYSTEMS

(71) Applicant: San Jamar, Inc., Elkhorn, WI (US)

(72) Inventors: Sherry Eckholm, Sun Prairie, WI (US); Matthew J. Poster, Madison, WI (US); Christopher A. Harris, Madison, WI (US); Katie Babcock, Milton, WI (US); Mike Muenstermann, Woodbury, MN (US); Mike Young, Mukwonago, WI (US); Brian Albrecht, Elkhorn, WI (US)

(73) Assignee: San Jamar, Inc., Elkhorn, WI (US)

( * ) Notice: Subject to any disclaimer, the term of this patent is extended or adjusted under 35 U.S.C. 154(b) by 215 days.

(21) Appl. No.: 15/717,444

(22) Filed: Sep. 27, 2017

(65) Prior Publication Data

US 2018/0084952 A1    Mar. 29, 2018

Related U.S. Application Data

(60) Provisional application No. 62/400,664, filed on Sep. 28, 2016.

(51) Int. Cl.
*A47J 47/00*    (2006.01)
(52) U.S. Cl.
CPC .................................. *A47J 47/005* (2013.01)
(58) Field of Classification Search
CPC .................................................... A47J 47/005
See application file for complete search history.

(56) References Cited

U.S. PATENT DOCUMENTS

| | | | |
|---|---|---|---|
| 648,632 A | 5/1900 | Parker | |
| 1,233,184 A | 7/1917 | Chadwick | |
| 3,698,594 A * | 10/1972 | Boehlert | A47G 19/03 220/495.01 |
| 3,837,634 A | 9/1974 | Cobb | |
| 4,800,845 A * | 1/1989 | Budd | A01K 5/0121 119/61.5 |
| 4,907,789 A | 3/1990 | Tice | |

(Continued)

FOREIGN PATENT DOCUMENTS

| | | |
|---|---|---|
| DE | 102006018729 A1 | 10/2007 |
| EP | 1549456 | 3/2008 |

(Continued)

OTHER PUBLICATIONS

Extended European Search Report dated Mar. 7, 2018 (EP Application No. 17194258.4).

(Continued)

*Primary Examiner* — Tyrone V Hall, Jr.
(74) *Attorney, Agent, or Firm* — Boyle Fredrickson S.C.

(57) ABSTRACT

A cutting board system that includes a cutting surface that removeably cooperates with at least one side of a base portion of the cutting board system. In a preferred aspect, the cutting surface includes a cutting layer and an indicator layer that underlies the cutting layer. Exposure of the indicator layer provides an indication as to degradation or use of the cutting layer and is indicative of desired replacement of the cutting surface. In a more preferred embodiment, respective cutting layers are associated with the generally opposite sides of the indicator layer such that the cutting surface is reversible.

22 Claims, 11 Drawing Sheets

(56) References Cited

U.S. PATENT DOCUMENTS

| | | | | |
|---|---|---|---|---|
| 5,366,208 A | * | 11/1994 | Benjamin | A47J 47/005 269/13 |
| 5,423,451 A | * | 6/1995 | Snyder | A47J 47/005 206/216 |
| 5,485,937 A | * | 1/1996 | Tseng | A47G 19/02 220/571 |
| 5,595,110 A | * | 1/1997 | Tseng | A47J 47/005 165/185 |
| 5,984,294 A | * | 11/1999 | Bogomolny | A47J 47/005 269/289 R |
| 6,422,551 B1 | * | 7/2002 | Brotz | A47J 47/005 269/13 |
| 6,478,292 B1 | * | 11/2002 | Sellers | A47J 47/005 269/285 |
| 6,651,970 B2 | | 11/2003 | Scott | |
| 6,695,299 B1 | | 2/2004 | Brotz | |
| D492,884 S | | 7/2004 | Swope | |
| 6,757,954 B2 | * | 7/2004 | Sei | A47J 36/02 269/289 R |
| 6,789,792 B1 | | 9/2004 | Angland | |
| 6,846,449 B2 | | 1/2005 | Martin et al. | |
| 6,913,255 B2 | | 7/2005 | Porchia et al. | |
| 6,955,722 B2 | | 10/2005 | Ackerman | |
| 6,986,931 B2 | | 1/2006 | Ackerman et al. | |
| 6,991,844 B2 | | 1/2006 | LeBoeuf et al. | |
| 6,994,335 B2 | | 2/2006 | Porchia et al. | |
| D519,016 S | | 4/2006 | Nudo | |
| 7,026,034 B2 | | 4/2006 | LeBoeuf et al. | |
| 7,036,809 B1 | | 5/2006 | Mitchell | |
| 7,059,952 B1 | | 6/2006 | McRoberts | |
| 7,125,011 B2 | | 10/2006 | McLaughlin | |
| 7,134,653 B1 | | 11/2006 | Ladenheim | |
| 7,178,798 B1 | | 2/2007 | Funk et al. | |
| D573,419 S | | 7/2008 | Kaposi | |
| D574,200 S | | 8/2008 | Pearl et al. | |
| D584,117 S | | 1/2009 | Curtin | |
| D587,031 S | | 2/2009 | Pourounidis et al. | |
| D587,539 S | | 3/2009 | Almeda et al. | |
| 7,533,875 B2 | | 5/2009 | Willen et al. | |
| D605,908 S | | 12/2009 | Pearl et al. | |
| 7,637,488 B2 | | 12/2009 | Zeng | |
| 7,647,654 B2 | | 1/2010 | Shamroth | |
| 7,758,029 B2 | | 7/2010 | Lim et al. | |
| 8,141,860 B2 | | 3/2012 | Goldman | |
| 8,220,789 B2 | | 7/2012 | Pourounidis et al. | |
| 8,286,956 B2 | | 10/2012 | Pearl et al. | |
| D687,268 S | | 8/2013 | Difante | |
| D718,989 S | | 12/2014 | Hoffstadt | |
| 9,155,427 B1 | | 10/2015 | Kumar | |
| 2003/0047044 A1 | | 3/2003 | Porchia et al. | |
| 2003/0049294 A1 | | 3/2003 | Porchia et al. | |
| 2003/0049394 A1 | | 3/2003 | Porchia et al. | |
| 2003/0049410 A1 | | 3/2003 | Munagavalasa et al. | |
| 2003/0071406 A1 | * | 4/2003 | Sellers | A47J 47/005 269/289 R |
| 2004/0011795 A1 | | 1/2004 | Porchia et al. | |
| 2004/0229554 A1 | | 11/2004 | Kaposi | |
| 2005/0248075 A1 | * | 11/2005 | McLaughlin | A47J 47/005 269/289 R |
| 2006/0151931 A1 | | 7/2006 | Mitchell | |
| 2007/0001359 A1 | * | 1/2007 | Pearl | A47J 47/005 269/289 R |
| 2007/0108685 A1 | * | 5/2007 | Casale | A47J 47/005 269/289 R |
| 2007/0245573 A1 | * | 10/2007 | Willen | A47J 47/005 30/302 |
| 2008/0048376 A1 | | 2/2008 | Farmer et al. | |
| 2009/0004421 A1 | * | 1/2009 | Youn | A47J 47/005 428/41.7 |
| 2009/0014935 A1 | * | 1/2009 | Zeng | A47J 47/005 269/302.1 |
| 2009/0096150 A1 | | 4/2009 | Cihan et al. | |
| 2009/0194925 A1 | | 8/2009 | Rolf | |
| 2009/0200723 A1 | * | 8/2009 | Lim | A47J 47/005 269/289 R |
| 2009/0283952 A1 | | 11/2009 | Sellers | |
| 2010/0194016 A1 | | 8/2010 | Tsui | |
| 2011/0169208 A1 | | 7/2011 | Almeda et al. | |
| 2011/0221111 A1 | | 9/2011 | Stigall | |
| 2011/0221112 A1 | | 9/2011 | Kent | |
| 2012/0034227 A1 | | 2/2012 | Arlen et al. | |
| 2012/0047696 A1 | | 3/2012 | Jung et al. | |
| 2012/0093571 A1 | | 4/2012 | Yeh | |
| 2013/0049275 A1 | | 2/2013 | Morgan | |
| 2015/0053056 A1 | | 2/2015 | Ramos | |

FOREIGN PATENT DOCUMENTS

| | | |
|---|---|---|
| GB | 2179240 A | 3/1987 |
| GB | 2408444 | 6/2005 |
| GB | 2449687 | 12/2008 |
| WO | 2013025244 | 2/2013 |
| WO | 2014074062 | 5/2014 |

OTHER PUBLICATIONS

Extended European Search Report dated Mar. 7, 2018 (EP Application No. 17194259.2).

* cited by examiner

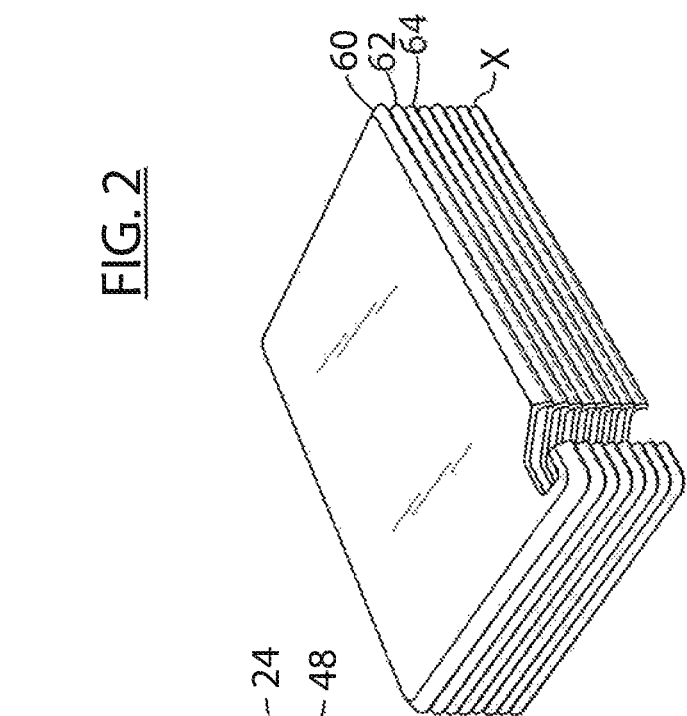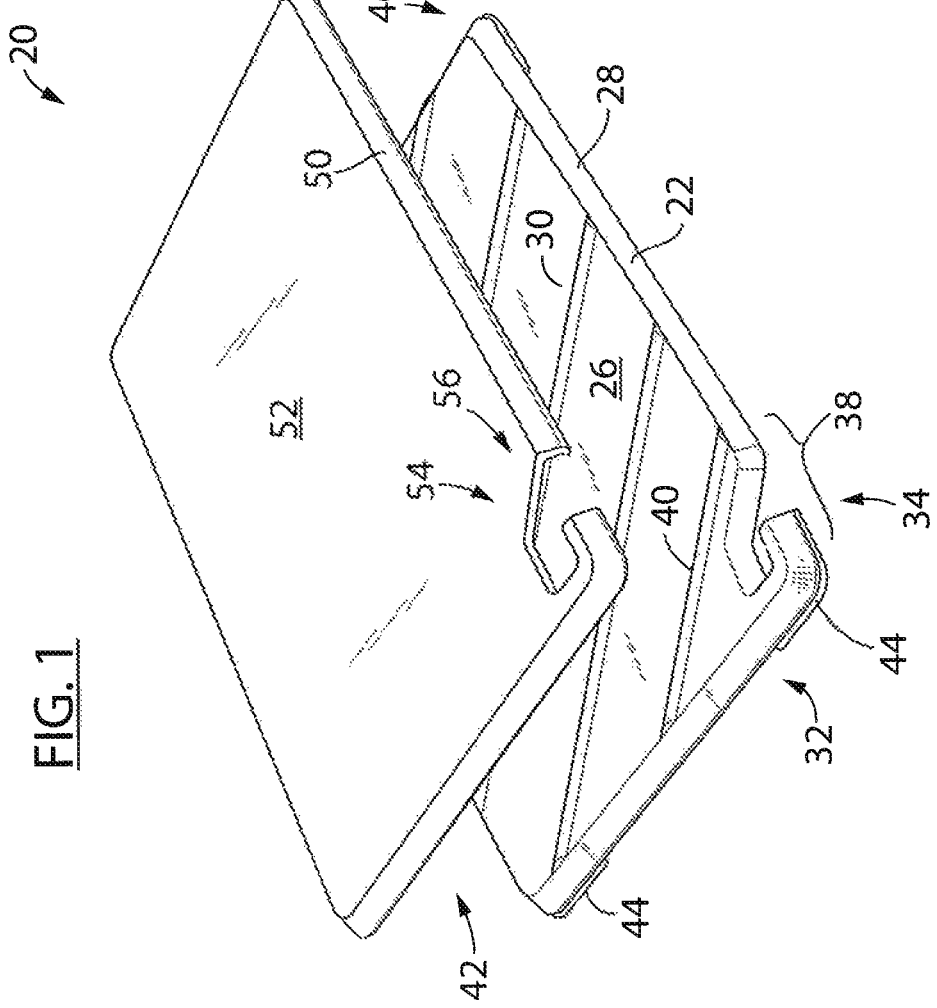

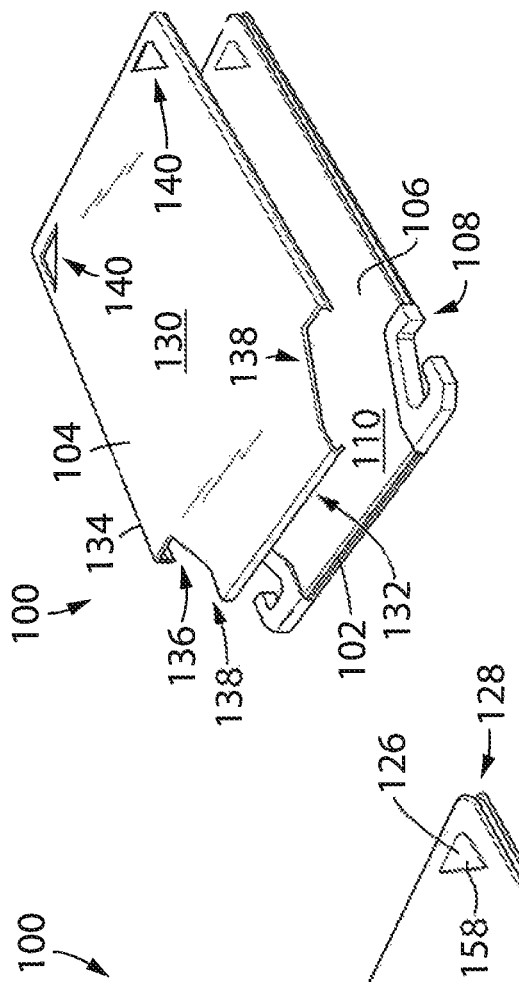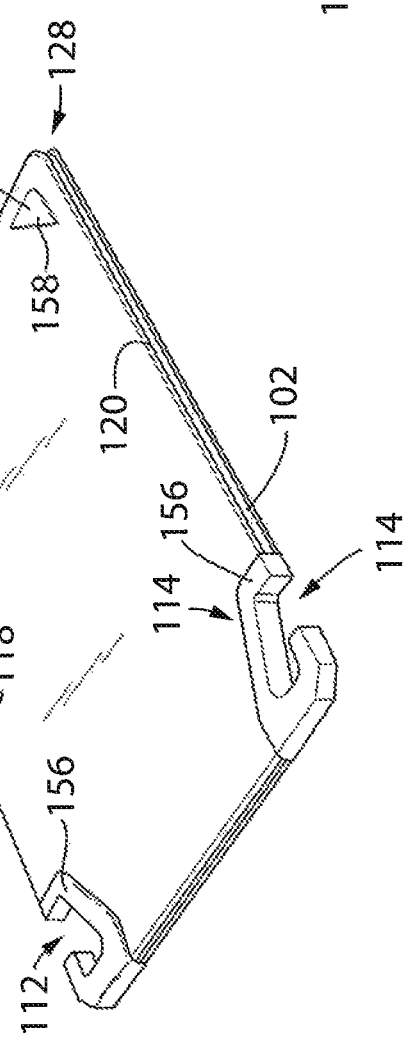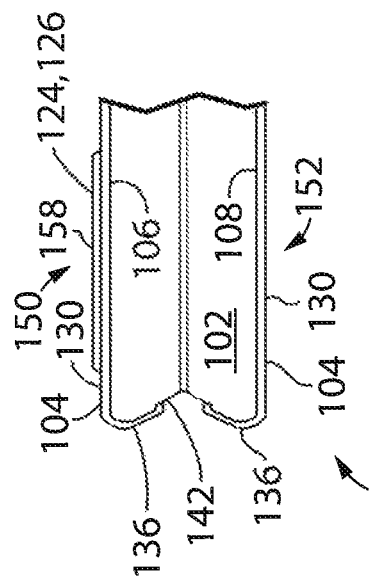

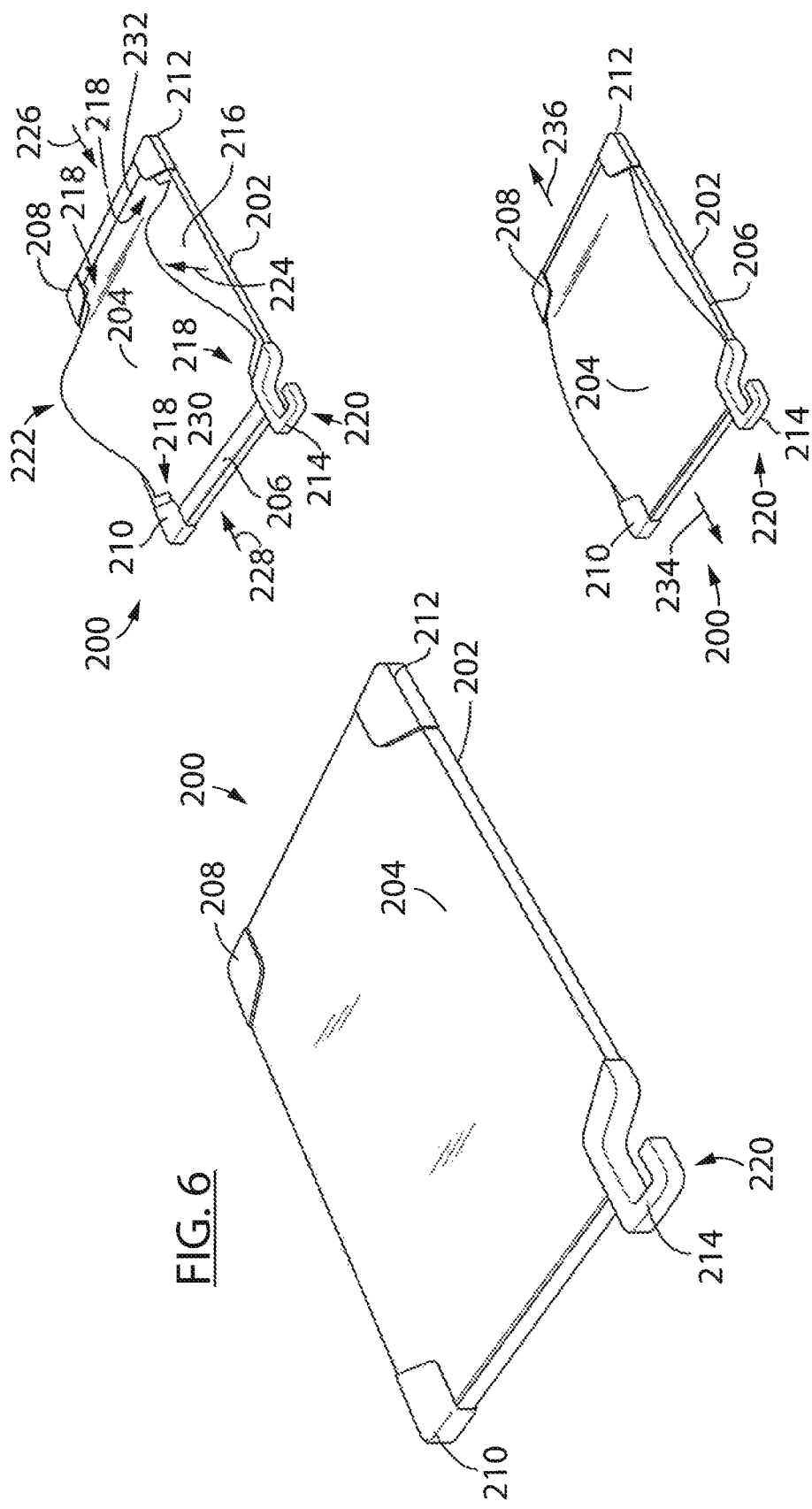

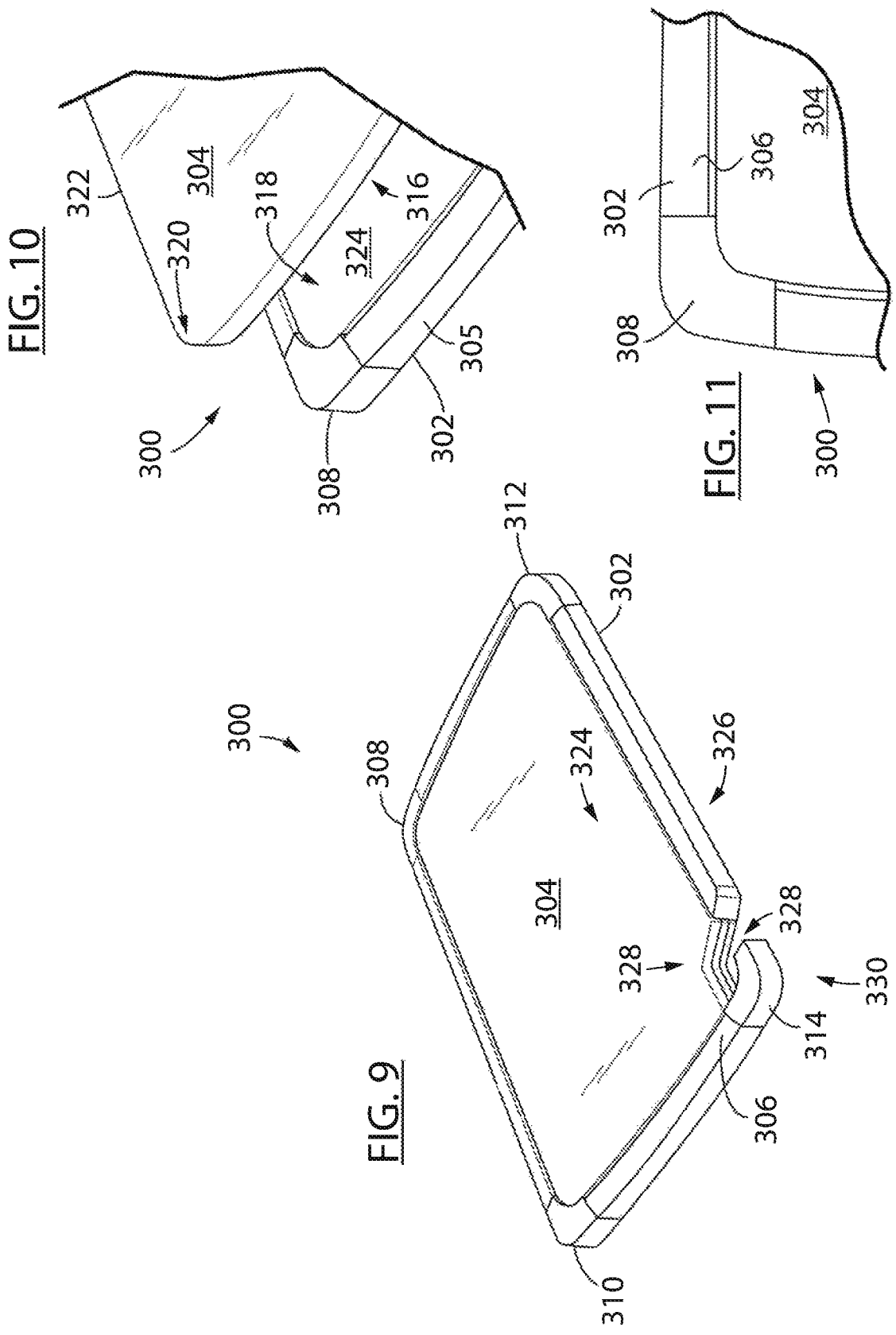

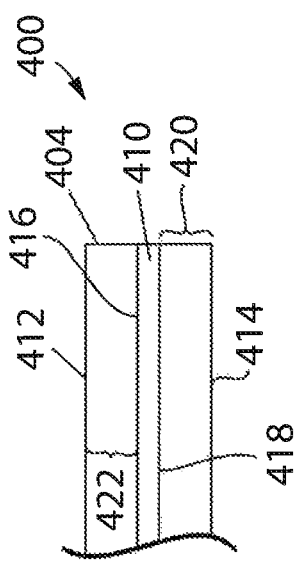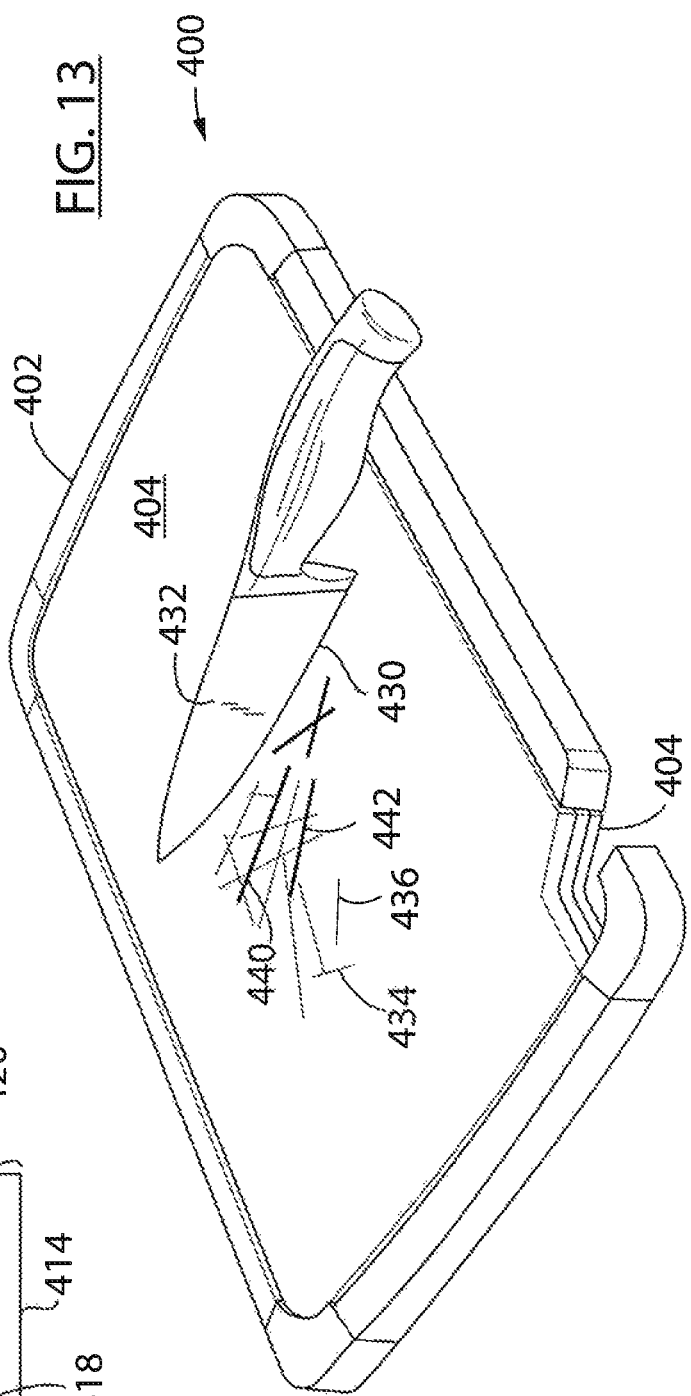

CUTTING BOARD SYSTEMS

CROSS REFERENCE TO RELATED APPLICATIONS

This application claims priority to U.S. Provisional Patent Application Ser. No. 62/400,664 filed on Sep. 28, 2016 titled "CUTTING BOARD SYSTEMS" and the disclosure of which is incorporated herein.

BACKGROUND OF THE INVENTION

This invention relates generally to food preparation services and, more particularly, to cutting board systems that include a replaceable, reversible, or disposable cutting surface that can be selectively securely supported by a base and/or a use indicator associated with the cutting surfaces and configured to provide an indication as to a degree of degradation of the working surface associated with the respective cutting surface.

Cutting boards are well known in the art as being useful in food preparation operations. Cutting boards are commonly configured to maintain the integrity of the cutting edge of cutlery while protecting the underlying counter surfaces from both the mess associated with the food preparation activities as well as damage by interaction with the cutlery. Cutting boards are provided in a variety of sizes, shapes, and configurations that are commonly configured for suitability with an intended operation or food preparation sequence.

Some cutting board configurations can present significant issues with respect to the development of bacteria upon the cutting surface. That is, during use, cut marks and other abrasions can render the cutting surface susceptible to less than desirable cleaning and/or removal of foodstuffs between uses. Accordingly, a first aspect of the present invention is to provide a cutting board with a robust cutting surface that can better resist penetration by cutting utensils.

In an attempt to mitigate propagation and/or generation of bacteria associated with use of such cutting boards, others provide cutting board systems that are configured for single use or otherwise disposable when the cutting surface is penetrated. Such configurations are less than economical as a majority of the material associated with formation of the cutting board remains unaffected by degradation of the cutting surface. Still further, as alluded to above, current cutting boards, particularly when used in commercial kitchen environments, require frequent replacement when cutting grooves or gouges are deep enough to become difficult to clean or become more susceptible to harboring of bacterial contamination.

Depending on the degree, severity, or number of grooves in a cutting surface, continued use of a degraded cutting surface can result in a violation of many applicable health codes and can often result in disciplinary action by health inspectors associated with commercial kitchen operations. Although many operators maintain their cutting boards through re-surfacing or planning processes in an effort to extend the usable life of the cutting board in compliance with applicable food health inspector criteria, frequent cutting board maintenance and/or replacement can be quite expensive. Accordingly, another aspect of the present invention is directed to providing a cutting board system that includes a replaceable cutting surface configured to removably cooperate with an underlying base portion or base that is configured to provide a desired rigidity to the cutting board system and accommodate disposal of only the more limited structure associated with the cutting surface.

A still further consideration to suitable cutting board use and maintenance is the determination as to when degradation of the cutting surface necessitates service and/or replacement of the cutting board or surface to mitigate food health code violations and bacterial generation and/or propagation. Too frequent resurfacing or replacement of cutting boards and/or cutting surfaces can increase operational costs and/or detract from the useable life associated with suitable use of the underlying cutting board system whereas insufficient replacement and/or resurfacing can result to unacceptable or intolerable contamination of food stuffs. Accordingly, there is a further need for a cutting board system that includes an indicator configured to provide an indication that resurfacing and/or replacement of the cutting surface is necessary or otherwise desired.

Accordingly, a need exists for a cutting board system that is relatively inexpensive to manufacturer or produce, easy to service and/or maintain in a useable condition, provides an indication as to the relative degree of degradation of the cutting surface, and solves other problems associated with the existing configurations.

SUMMARY OF THE INVENTION

The present invention discloses a cutting board system that resolves one or more of the shortcomings disclosed above.

One aspect of the present invention discloses a cutting board system that includes a base portion that is constructed of a first material. A cutting surface that is constructed of a second material such that the cutting surface removeably cooperates with the base portion and such that the cutting surface preferably overlies at least a majority of the base portion and is securable relative thereto and is replaceable with other similarly shaped cutting surfaces.

Another aspect of the present invention discloses a cutting board system comprising a base portion and a cutting surface constructed of a cutlery friendly material and shaped to removably cooperate with the base portion such that the cutting surface overlies at least a majority of the base portion and is securable relative thereto and is replaceable with other cutting surfaces having a similar shape as the cutting surface.

Another aspect of the present invention discloses a cutting board system including a base portion having a surface defined within a perimeter of the base portion and at least one supporting projection extending outwardly from the surface and oriented laterally inboard of the perimeter, and a cutting surface constructed of a cutlery friendly material and shaped to removably cooperate with the base portion. The system also includes the cutting surface overlying at least a majority of the surface of the base portion and is securable relative to the base, such that the cutting surface is replaceable with other cutting surfaces having a similar shape as the cutting surface.

Still another aspect of the present invention discloses a cutting board system having a base portion that includes a first surface and an opposing second surface defined within a perimeter of the base portion. The system also includes at least one supporting projection extending outwardly from the first surface of the base and oriented laterally inboard of the perimeter, and at least one supporting projection extending outwardly from the second surface of the base and oriented laterally inboard of the perimeter. The system may also include at least one reversible cutting surface constructed of a cutlery friendly material and shaped to removably cooperate with the base portion and at least one of the projection such that the reversible cutting surface is securable relative thereto. The reversible cutting surface of the system is replaceable with other reversible cutting surfaces having a similar shape as the reversible cutting surface.

Another aspect of the present invention discloses a cutting board system that includes a cutting surface that includes a cutting layer or working surface configured to be engaged by kitchen utensils such as cutlery or the like. The cutting surface includes an indicator layer that underlies the cutting layer. The indicator layer is configured to provide an indication as to a relative degree of penetration or degradation of the cutting layer. In a preferred embodiment, a discrete cutting layer is associated with each of the generally opposite sides of the indicator layer such that the cutting surface is reversible such that both of the generally opposite planar sides of the cutting surface are usable as working surfaces of the cutting boards.

Another aspect of the present invention includes a cutting board system having cutting surface constructed of a cutlery friendly material, including a degradation indicator and a working face disposed over the degradation indicator, where the working face is visually distinct from the degradation indicator.

Another aspect of the present invention includes cutting board system having a base portion and a cutting surface constructed of a cutlery friendly material that is configured to overlay a majority of the base portion. The cutting surface may include a degradation indicator and a working face disposed over the degradation indicator, where the working face is visually distinct from the degradation indicator.

Yet another aspect of the present invention includes a cutting board system having a base portion and a cutting surface constructed of a cutlery friendly material that is configured to overlay a majority of the base portion. The cutting surface may include a degradation indicator having a first color, and a working face disposed over the degradation indicator, the working face having a second color that is different from the first color. Furthermore, in a first configuration the working face has a first thickness that is sufficient to cover the degradation indicator from a view of a user, and in a second configuration the working face has been degraded to a second thickness that is less than the first thickness and the degradation indicator is at least partially visible to the view of the user.

These and other aspects, features, and advantages of the present invention will become apparent from the detailed description, claims, and accompanying drawings.

DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1 is an exploded perspective view of a cutting board system, in accordance with one embodiment of the present invention, showing a base and a removable cutting surface;

FIG. 2 is a perspective view of multiple nested cutting surfaces of the cutting board system of FIG. 1;

FIG. 3 is a perspective view of a cutting board system, in accordance with an alternative embodiment of the present invention, showing a base and a removable cutting surface;

FIG. 4 is an exploded perspective view of the cutting board system of FIG. 3;

FIG. 5 is a partial cross-sectional view the cutting board system of FIG. 3:

FIG. 6 is a perspective view of a cutting board system, in accordance with an alternative embodiment of the present invention, showing a base and a removable cutting surface;

FIG. 7 is a perspective view of the cutting board system of FIG. 6, showing the removable cutting surface partially removed from the base;

FIG. 8 is a perspective view of the cutting board system of FIG. 6, showing the removable cutting surface being inserted into the base;

FIG. 9 is a perspective view of a cutting board system, in accordance with an alternative embodiment of the present invention, showing a base with a perimeter portion bordering a removable cutting surface;

FIG. 10 is a partial perspective view of a cutting board system of FIG. 9, showing the removable cutting board surface being inserted into the base;

FIG. 11 is a partial detailed top view of the cutting board system of FIG. 9, showing a corner of the perimeter portion of the base securing the removable cutting surface in a frictional engagement;

FIG. 12 is a partial cross-sectional view of an alternative embodiment of the cutting board system of FIG. 9, wherein the removable cutting surface includes a wear indicator;

FIG. 13 is a prospective view of the cutting board system of FIG. 12;

DETAILED DESCRIPTION OF THE PREFERRED EMBODIMENTS

Figure 14:
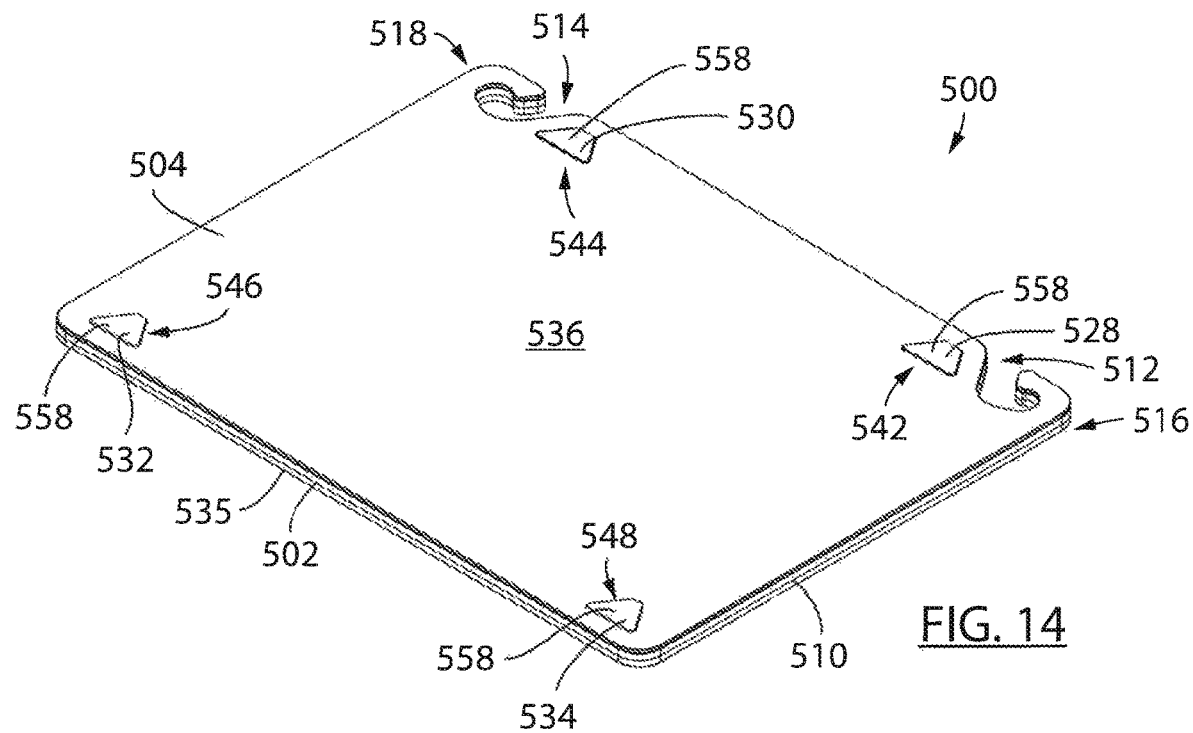
FIG. 14 is a perspective view of a cutting board system, in accordance with an alternative embodiment of the present invention, showing a base with elevated structures on opposing surfaces for engaging and retaining opposing removable cutting surfaces.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

The various features and advantageous details of the subject matter disclosed herein are explained more fully with reference to the non-limiting embodiments described in detail in the following description.

Illustrative embodiments of cutting board systems in accordance with various aspects of the present invention are shown in FIG. 1 through FIG. 25. Initially, FIGS. 1 and 2 show a cutting board system 20 according to a first embodiment of the invention. Cutting board system 20 includes a base portion or a base 22 and a cutting surface 24 that removably or interchangeably cooperates with base 22. Base 22 is generally defined by a body 26 that is defined by a perimeter 28 that bounds a first or top side 30 and an underside 32 of base 22. A hook 34 is defined by a portion of body 36 and is generally associated with a portion 38 of perimeter 28. In one embodiment, one or more upwardly extending optional ribs 40 that are associated with top side 30 of base 22 and configured to cooperate with an underside 42 associated with cutting surface 24. Ribs 40 are constructed and oriented to support cutting surface 24 relative to base 22 in a manner that limits unintended or undesired translation of cutting surface 24 during use of cutting board system 20.

One or more supports or feet 44 are associated with underside 32 of body 26 of base 22. Feet 44 are preferably constructed of a material, such as silicone or rubber type materials, that is selected to mitigate slippage between base 22 and an underlying support surface, such as a countertop or the like (not shown), during use of cutting board system 20. Perimeter 28 of base 22 is defined by an edge 46 that is constructed to matingly cooperate with an edge portion 48 associated with a perimeter 50 of cutting surface 24. In a preferred embodiment, edge 48 of cutting surface 24 and/or edge 46 of base 22 are flexible or deformable to provide a generally frictional engagement or snap fit interaction between cutting surface 24 and base 22. Preferably, cutting surface 24 and base 22 cooperate with one another in a manner wherein the cutting surface 24 can be manually removed from base 22 when replacement is desired.

Cutting surface 24 includes a top side or working face 52 that is configured to resist cutting operations associated with use of cutting board system 20. Preferably, at least working face 52 of cutting surface 24 is formed of a "cutlery friendly" material that resists penetration by the sharpened edge of the cutlery but does not unduly dull the sharpened edge of the cutlery or other kitchen utensils during normal use of the cutting surface 24. That is to say, cutting surface 24 is preferably conducive to cut resistance and is cutlery "friendly" to mitigate premature degradation of the sharpened edge of the cutlery due to interaction of the blade with working face 52 associated with surface 24. For instance, the cutting surfaces disclosed herein can be formed of one or more of a polypropylene co-polymer or type material, a polypropylene mono-polymer or type material, a high-density polyethylene or type material, and/or one or more combinations thereof.

It is appreciated that cutting surface 24 and base 22 can be constructed of the same or dissimilar materials. Cutting surface 24 includes a hook portion 54 that is generally defined by a portion 56 of perimeter 50 of cutting surface 24. Hook portion 54 associated with cutting surface 24 is constructed to generally overlie hook 34 defined by base 22 of cutting board system 20 when a respective cutting surface 24 is engaged therewith. Hooks 34, 54 allows cutting surfaces 24 and base 22, or a cutting surface and base pair associated with cutting board system 20 to be suspended in a generally vertical orientation when not in use and further facilitates single handed convenient transport of cutting board system 20 in addition to the hanging orientation.

Referring to FIG. 1, hooks 34, 54 are positioned adjacent a corner of the respective cutting surface 23 and base 22, with its corresponding void intersecting the longitudinal edge of cutting surface 24 and/or edge 46 of base 22. However, alternative orientations, positions and sizes of the hook 34, 54 are considered well within the scope of the present invention. Furthermore, FIG. 1 shows a cutting board system 20 including a single hook 34, 54 in the respective cutting surface 23 and base 22, however other embodiments of the present invention may include multiple hooks as will be described in further detail below. It is further appreciated that the shape and/or contour associated with each hook 34, 54 could be provided in various form factors wherein the respective hooks 34, 54 generally overlie one another, enhance manual transport of the resultant cutting board, and facilitate hanging or otherwise suspended orientations of the cutting board relative to support structures such as ancillary hooks, baking or wire form racks, etc. Regardless of their relative shape, respective hook portions 34, 54 associated with base 22 and cutting surface 24 further allow cutting surfaces 24 to be indexed or conveniently positionally oriented relative to base 22 to achieve the desired secure interaction between a respective cutting surface 24 and a respective base 22.

The generally smooth surface associated with working face 52 of cutting surface 24 extends generally continually in the orthogonal plane normal to a cutting direction such that edge portion 48 associated with cutting surface 24 generally wraps over at least a portion of, and preferably a majority of, an exterior footprint associated with perimeter 28 of base 22 when a respective cutting surface 24 is secured thereto. Such a construction mitigates the exposure of base 22 to foodstuffs as well as the cutting edge associated with knives or the like during use of cutting board system 20. In a preferred embodiment, base 22 is provided in a weighted construction, via the selection of the material associated with base 22 and/or via inclusion of a metallic or dense material insert associated therewith, so as to provide a more robust and stable configuration associated with cutting board system 20.

Referring to FIG. 2, cutting board system 20 preferably includes a plurality of cutting surfaces 60, 62, 64, . . . , X that each have a generally similar or substantially the same shape as cutting surface 24 such that the plurality of cutting surfaces 24, 60-X are stackable or otherwise nestable when not in use. Such a consideration provides a neat and compact presentation and storage of multiple cutting surfaces 24, 60-X associated with maintaining use of cutting board system 20. Upon degradation of discrete cutting surface 24, cutting surface 24, can be simply manually removed from base 22 such that a subsequent cutting surface 60-X can be associated with base 22 for continued use of cutting board system 20. In one embodiment, the plurality of cutting surfaces 24, 60, 62, 64, . . . , X may be provided in various colors to allow individual cutting surfaces of a given color to be utilized in the preparation of a particular category of foodstuff, i.e., raw meat, seafood, poultry, produce, wheat, etc. Accordingly, the interchangeable cutting surfaces 60, 62, 64, . . . , X may be utilized to prevent cross-contamination or allergen exposure during food preparation. Alternatively, the base 22 may be provide in various colors as described above, either independent of or in combination with colored cutting surfaces 60, 62, 64, . . . , X.

Turning now to FIGS. 3-5, a cutting board system 100 according to another embodiment of the invention is shown. Like cutting board system 20, cutting board system 100 includes a base portion or base 102 that is constructed to removably cooperate with one or more replaceable or interchangeable cut resistive but cutlery friendly cutting surfaces 104 without the use of any extraneous or removable fasteners or the like. Unlike cutting board system 20, base 102 of cutting board system 100 includes a first side 106 and an opposing second side 108 that are each constructed to removably cooperate with a respective cutting surface 104 such that cutting or other food preparation operations can be performed on each of the respective alternate lateral "top" and "bottom" sides of cutting board system 100.

Base 102 is generally defined by a body 110 that defines a first hook 112 and a second hook 114 that are preferably associated with a common end 116 associated with the opposite longitudinal edges 118, 120 of cutting board system 100. Such a consideration provides a configuration wherein discrete cutting board systems 100 can be suspended from either of hooks 112, 114 in a generally repeatable manner regardless as to which side of the cutting board system 100 is being used and independent of the user's respective grip of the cutting board system 100. Understandably, although cutting board system 100 is shown as including two hooks that are associated with a common longitudinal end 116 of cutting board system 100, other numbers, orientations, and configurations of hooks 118, 120 are envisioned. For instance, each corner, one corner, or opposing corners could include a respective hook. It is further appreciated that the discrete hooks could also be omitted as a function of user preference.

Base 102 includes one or more projections 124, 126 that are associated with an opposite longitudinal end 128 of base 102. Referring to FIG. 4, cutting surface 104 includes a working face 130 and an opposing base facing surface or face 132. Cutting surface 104 is generally defined by a perimeter 134 that includes a lip 136 that is formed about at least a portion thereof. Perimeter 134 of cutting surface 104 includes one or more cutouts 138, 140 that are shaped to cooperate with respective projections 124, 126 and/or hooks 112, 114 when a respective cutting surface 104 is associated with base 102. The construction and orientation of hooks 112, 114 and projections 124, 126 associated with base 102 and cutouts 138, 140 associated with cutting surface 104 allow respective cutting surfaces 104 to be quickly indexed or positionally associated relative to base 102 for securing interaction therebetween when a discrete cutting surface 104 is engaged therewith.

In one embodiment of the present invention, shown in FIG. 4, the projections 124, 126 and corresponding cutouts 138 are shown to have a generally triangular outer perimeter shape. However, alternative geometric shapes are considered within the scope of the present invention. Furthermore, various geometric shapes of the projections 124, 126 and corresponding cutouts 140 of cutting board system 100 may be utilized to specify particular categories of foodstuff, i.e., raw meat, seafood, poultry, produce, wheat, etc., that is to be associated with a given cutting board system 100. For example, generally triangular projections 124, 126 and corresponding cutouts 140 may identify a base 102 and cutting surface 104 that is to be used in the preparation of a first category of foodstuff, while generally rectangular projections (not shown) and corresponding rectangular cutouts (not shown) may identify a base 102 and cutting surface 104 that is to be used in the preparation of a second category of foodstuff. Use of such distinct projection 124, 126 and cutout 140 geometries will further facilitate quickly indexing or positioning of the proper cutting surface 104 relative to respective base 102, securing interaction therebetween, and aid in preventing cross-contamination or allergen exposure during food preparation. Moreover, the base 102 and cutting surfaces 104 may also be color coded, as was described above in cutting system 20, to provide further visual indicia as to prevent cross-contamination or allergen exposure during food preparation.

Referring to FIGS. 4 and 5, respective portions associated with perimeter 142 of base 102 are contoured to snap fittingly cooperate with lip 136 associated with discrete cutting surfaces 104 when the respective cutting surfaces 104 are engaged with base 102. One or more of the edge portions associated with perimeter 142 of base 102 or lip portions 136 associated with discrete cutting surfaces 104 are deformable to accommodate the snap fittable interaction between the discrete cutting surfaces 104 and base 102 regardless of the respective work facing side 150, 152 (FIG. 5) associated with base 102 of cutting board system 100 to which a cutting surface is secured. Referring to FIGS. 3 and 5, a support surface facing side 156, 158 associated with each of hook 112, 114, and projections 124, 126 preferably extends in a direction that is generally normal to the plane associated with the respective working faces of cutting surfaces 104 so as to be slightly proud of the respective working face 130 associated with the discrete cutting surfaces 104 that are engaged with the respective alternate lateral sides of cutting board system 100.

Surfaces 156, 158 are preferably constructed of slip limiting material, such as silicone and/or rubber type materials such that the projection of discrete hooks 112, 114 and projections 124, 126 beyond the plane defined by the working face 130 associated with the discrete cutting surfaces 104 resists slippage of cutting board system 100 relative to a support surface, such as a counter surface, during use of either discrete working surface side of cutting board system 100 during cutting or food preparation processes or other uses of cutting board system 100.

FIGS. 6-8 show a cutting board system 200 according to another embodiment of the present invention. Like cutting board systems 20 and 100, cutting board system 200 includes a base 202 that is constructed to removably cooperate with one or more cutting surfaces 204. Base 202 is defined by a body 206 wherein one or more corner portions 208, 210, 212, 214 of base 202 extend in an outward lateral direction relative to a cutting surface facing side 216 of body 206. Each cutting surface 204 includes a plurality of cutouts 218, as shown in FIGS. 7 and 8, that are oriented at the respective corners associated with cutting surface 204. Like cutting board systems 20, 100; cutting surface 204 and/or base 202 are preferably constructed of a cut resistive but knife edge friendly material to provide a desired usable life associated with each cutting surface 204 and without unduly dulling the cutting edges of knives or other kitchen utensils associated therewith. Cutouts 218 are constructed to slideably cooperate with a respective corner portion 208, 210, 212, 214 associated with base 202 so as to generally secure cutting surface 204 relative to base 202. At least one of corner portions 208, 210, 212, 214 defines a hook portion 220 of base 202. It is appreciated that cutouts 218 can compress into the respective corner portions 208, 210, 212, 214 associated with base 202 or that corner portions 208, 210, 212, 214 can be configured to generally overlie a portion of the discrete cutting surfaces 204 proximate the respective cutouts 218 when respective cutting surfaces 204 are secured to base 202.

Still referring to FIGS. 6-8, base 202 is defined by a generally rigid construction, whereas one or more of corner portions 208, 210, 212, 214, and/or respective cutting surfaces, 204, can be deformable and/or compressible so as to accommodate slidable interactions between cutouts 218 associated with cutting surface 204 and the respective adjacent corner portion 208, 210, 212, 214 associated with base 202. As shown in FIG. 7, upon use or consumption of a respective cutting surface 204, a center portion 222 of a respective cutting surface 204 can be translated in a generally outward or upward direction, indicated by arrow 224, relative to support surface 216 of base 202, thereby accommodating inward longitudinal translation, indicated by arrows 226, 228 of the alternate longitudinal ends 230, 232 of cutting surface 204. Such manipulation allows cutouts 218 to disengage from respective corner portions 208, 210, 212, 214 of base 202 to effectuate removal of cutting surface 204 from base 202. Association of a subsequent cutting surface 204 relative to base 202 and subsequent outward longitudinal translation, indicated by arrows 234, 236, of cutting surface 204 relative to base 202 provides an indexing and secure orientation of cutouts 218 relative to respective corner portions 208, 210, 212, 214 relative to base 202 for subsequent use of cutting board system 200.

It should be appreciated that cutting surface 204 has a generally planar construction as compared to cutting surfaces 24, 104 associated with cutting board systems 20, 100, respectively. It should be further appreciated that cutting surface 204 has a generally mirror construction associated with opposite longitudinal ends 230, 232 of the discrete cutting surfaces 204 such that opposing sides of cutting surface 204 can be exposed and/or provide an exposed working face of the discrete cutting surfaces 204. Said in another way, cutting surfaces 204 cooperate with base 202 in a reversible manner such that each cutting surface provides two discrete working faces.

It should further be appreciated that the opposite lateral sides of base 202 are generally mirror image constructions of one another such that a respective cutting surface 204 can be associated with either of the generally opposite lateral sides of base 202 such that cutting board system 200 is likewise flippable or otherwise reversible so as to concurrently provide multiple working faces. Like cutting board system 100, it should further be appreciated that corner portions 208, 210, 212, 214 associated with cutting board system 200 are configured to be oriented proud or extending beyond cutting surface 204 in an outward lateral direction such that once a cutting surface 204 is engaged with a respective lateral side of base 202, corner portions 208, 210, 212, 214 provide feet and/or anti-slipping support structures associated with the use of cutting board system 200 during use of either of the generally opposite lateral sides of cutting board system 200.

FIGS. 9-11 show various views of a cutting board system 300 according to another embodiment of the invention. Cutting board system 300 includes a base 302 that is constructed to removably cooperate with one or more cutting surfaces 304 wherein one or both of the base and the cutting surface are formed of a cut resistive but knife friendly material. Base 302 includes a body 305 that is generally defined by a perimeter portion 306 that includes a plurality of corner portions 308, 310, 312, 314; a center portion 316 that is bounded by perimeter 306, and a cavity 318 that is shaped to removably cooperate with a respective cutting surface 304. One or more of corner portions 308, 310, 312, 314 associated with base 302 are constructed to be deformable so as to provide a compression or a generally snap fit cooperation with a respective cutting surface 304 associated with base 302. Preferably, each corner portion 308, 310, 312, 314 is formed of a rubber or silicone material that provides a hysteresis or at rest configuration configured to snugly engage a respective corner portion 320 defined by a perimeter 322 associated with a respective cutting surface 304.

Generally outward lateral deflection of respective corner portions 308, 310, 312, 314, and/or generally upward displacement of cutting surface 304 relative to base 302, accommodates removable and/or interchangeable cooperation of cutting surfaces 304, with base 302 upon use or consumption of a respective cutting surface 304. As shown in FIG. 9, it should be appreciated that the alternate lateral sides 324, 326 of base 302 have generally mirror image constructions relative to one another such that each lateral side 324, 326 of base 302 of cutting board system 300 is constructed to removably cooperate with a respective cutting surface 304. It should further be appreciated that, unlike cutting board system 200, cutting surfaces 304, have a generally non-symmetrical construction as defined by a cutout 328. Cutout 328 associated with each cutting surface 304, and a corresponding cutout associated with base 302, cooperate with one another to generally define a hook 330 of cutting board system 300.

Alternatively, it is appreciated that hook 330 of cutting board system 300 could be generally defined by perimeter 306 and or a respective corner portion 314 associated with base 302 such that cutting surfaces 304 could be provided in a generally symmetrical construction to facilitate reversible and/or variable orientation connection or support of discrete cutting surfaces 304 relative to base 302. In a preferred embodiment, it is further appreciated that one or more of perimeter 306 and/or corner portions 308, 310, 312, 314 be constructed to cooperate with cutting surface 304 such that a respective portion of perimeter 306, and/or respective corner portions 308, 310, 312, 314 associated with base 302, extend in a lateral direction generally normal to the working face associated with cutting surfaces 304 so as to be proud of, or extend beyond the plane defined by the discrete cutting surfaces 304, to support cutting board system 300 during use of the same.

Like cutting board systems 100, 200, cutting board system 300 provides a cutting board system that includes multiple replaceable or interchangeable cutting surfaces 304 and a cutting board system that provides multiple usable cutting surfaces in a reversible configuration. Like cutting board systems 100, 200, cutting board system 300 may also provide a base 302 and/or cutting surfaces 304 that are color coded for use with particular foodstuffs, as to prevent cross contamination during food preparation. Additionally, like cutting board system 100, the geometry of the perimeter 306 and/or corner portions 308, 310, 312, 314, and the corresponding geometry of the perimeter 322 associated with a respective cutting surface 304, may also be distinct or otherwise coded for use with particular foodstuffs to prevent cross contamination between food stuffs during food preparation. That is to say unique geometry of perimeter 306, 322 may provide for indexing of a given cutting surface 304 within a particular base 302 that is particular to use with a selected category of foodstuff.

FIGS. 12 and 13 show a cutting board system 400 according to another aspect of the present invention. It should be appreciated from a comparison of FIGS. 9 and 13 that cutting board system 400 has a generally similar construction, use, and operation as cutting board system 300. As disclosed further below, it is appreciated that one or more of cutting board systems 20, 100, 200, and 300, or the discrete cutting surfaces associated therewith, could be provided with the additional indicator functionality associated with cutting board system 400 as disclosed further below.

Cutting board system 400 includes a base 402 that is constructed to removably cooperate with one or more cutting surfaces 404. Cutting surfaces 404 are formed of cut resistive but knife friendly material and are constructed to removably cooperate with base 402 in a manner similar to that described above with respect to cutting board system 300. Unlike cutting surface 304, each cutting surface 404 also includes a degradation indicator, wear or use indicator or indicia, or simply referred to as an indicator 410 that is disposed generally beneath at least one working face 412 associated with cutting surface 404. As disclosed further below, prior to use of cutting surface 404, preferably a majority of indicator 410 is obscured from view, inspection, or exposure by surface 404. It is further appreciated that an edge portion or portion of the cutting face may provide an indicator, prior to use of cutting board system 300 of the presence of indicator 410 generally behind working face 412 to facilitate explanation of or notice of the presence of indicator 410 to the user prior to use of cutting surface 304. Referring to FIG. 12, indicator 410 is disposed between adjacent working faces 412, 414, such that each cutting surface 404 is reversible and/or can be associated with respective opposite lateral sides 416, 418 of indicator 410 when in use as a cutting surface.

Indicator 410 is offset, as indicated by dimensions 420, 422 from respective working faces 412, 414 associated with cutting surface 404. In one embodiment of the invention, working faces 412, 414 have dimensions 420, 422 of approximately preferably between 0.0325 millimeters or 0.001 inches and 1.0125 millimeters or 0.040 inches, and more preferably, between approximately between 0.500 millimeters or 0.0196 inches and 0.765 millimeters or 0.030 inches. As used herein, use of the term "approximately" with respect to the dimensions recited above include dimensions within the respective upper and lower thickness bounds+/−10% of the respective dimension. During use of cutting board system 400, a cutting edge 430 associated with respective cutting tool, such as a knife 432 or knife blade, interacts with working face 412, 414 such that cut marks 434, 436 are formed in the discrete working face 412, 414 associated with cutting surface 404. During degradation, or use of cutting surface 404, cut marks 434, 436 are formed in cutting surface 404 and eventually penetrate cut depth 422, 420 such that indicator 410 is visible, as indicated by cut marks 440, 442, to the user of cutting board system 400. The appearance of indicator 410 during use of cutting surface 404 provides an indication that cutting surface 404, has degraded or been used to the point of requiring replacement in order to maintain the desired degree of sanitation associated with continued use of cutting surface 404. The appearance of indicator 410 denotes to the user the desired replacement and/or change, flip, or reversal of the respective cutting surface 404 relative to base 402. Understandably, when indicator 410 is perceivable from both of working faces 412, 414, cutting surface 404 has been reversed and has been used through its usable service life and should be discarded, resurfaced or reconditioned, and/or otherwise replaced.

It is appreciated that the functionality of indicator 410 can be provided in a number of modalities including as different colors or layers associated with the formation of cutting surface 404. The coloration can be provided in a laminate construction or as an additive to the formation of cutting surface 404 from a unitary material. In one embodiment, the cutting surface 404 may be formed via a coextrusion process in which the distinct layers of the indicator 410 and one or more adjacent working faces 412, 414 are simultaneously extruded in a layered configuration to form the discrete intended cutting surface 404. Alternatively, the cutting surface 404 may be formed via injection molding of the working faces 412, 414 around a core formed of the indicator 410. The appearance of one or more of cut marks 440, 442 that expose indicator 410 denote the desire and/or necessity associated with suspending use of each discrete side of cutting surface 404.

It is further appreciated that indicator 410 could be provided as multiple indicators indicative of a "near replacement" or a "necessary to replace" indicator associated with the continued use of cutting surface 404. Although cutting surface 404 is shown as having a generally similar construction, shape, and cooperation with base 402, it is appreciated that each of the cutting surfaces disclosed in the embodiments above could each include such functionality. It is further appreciated that one or more of cutting surfaces 24, 60, 62, 64, 104, 204 could be provided with similar functionality associated with providing an indication as to the desired or necessary replacement associated with suspending use of the respective cutting surfaces to maintain the desired degree of sanitary kitchen conditions.

It is further appreciated that indicator 410 could be provided in cutting surfaces having generally non-reversible or single working face configurations. It is appreciated that indicator 410 could be formed in any number of ways such as by a laminate assembly or construction associated with the formation of cutting surface 404 or as additive, insert, or injectable material associated with formation of cutting surface. Regardless of the methodology utilized to manufacture cutting surface 404, indicator 410 is intended to become visible or otherwise discernable during use of the cutting surface to designate a relative degree of penetration or degradation associated with the use of the cutting surface equipped with such an indicator without otherwise rendering the cutting surface unusable.

Turning now to FIGS. 14-22 and initially FIG. 14, a cutting board system 500 according to another embodiment of the invention is shown. Like cutting board systems 20, 100, 200, 300, and 400, cutting board system 500 includes a base portion or base 502 that is constructed to removably cooperate with one or more replaceable or interchangeable cut resistive but knife friendly cutting surfaces 504 without the use of any extraneous or removable fasteners or the like. Like cutting board system 100, 200, 300 and 400, base 502 of cutting board system 500 includes a first side 506 and an opposing second side 508 that are each constructed to removably cooperate with a respective cutting surface 504 such that cutting or other food preparation operations can be performed on respective alternate sides of cutting board system 500.

Base 502 is generally defined by a body 510 that defines a first hook 512 and a second hook 514 that are preferably associated with opposing ends 516, 518 of a longitudinal edge 519 of the cutting board system 500. However, alternative numbers, positions and orientations of hooks 212, 514 are considered within the scope of the present invention. Such a consideration provides a configuration wherein discrete cutting board systems 500 can be suspended from either of hooks 512, 514 in a generally repeatable manner regardless as to which side of the cutting board system 500 is being used and independent of the user's respective grip of the cutting board system 500.

Figure 15:
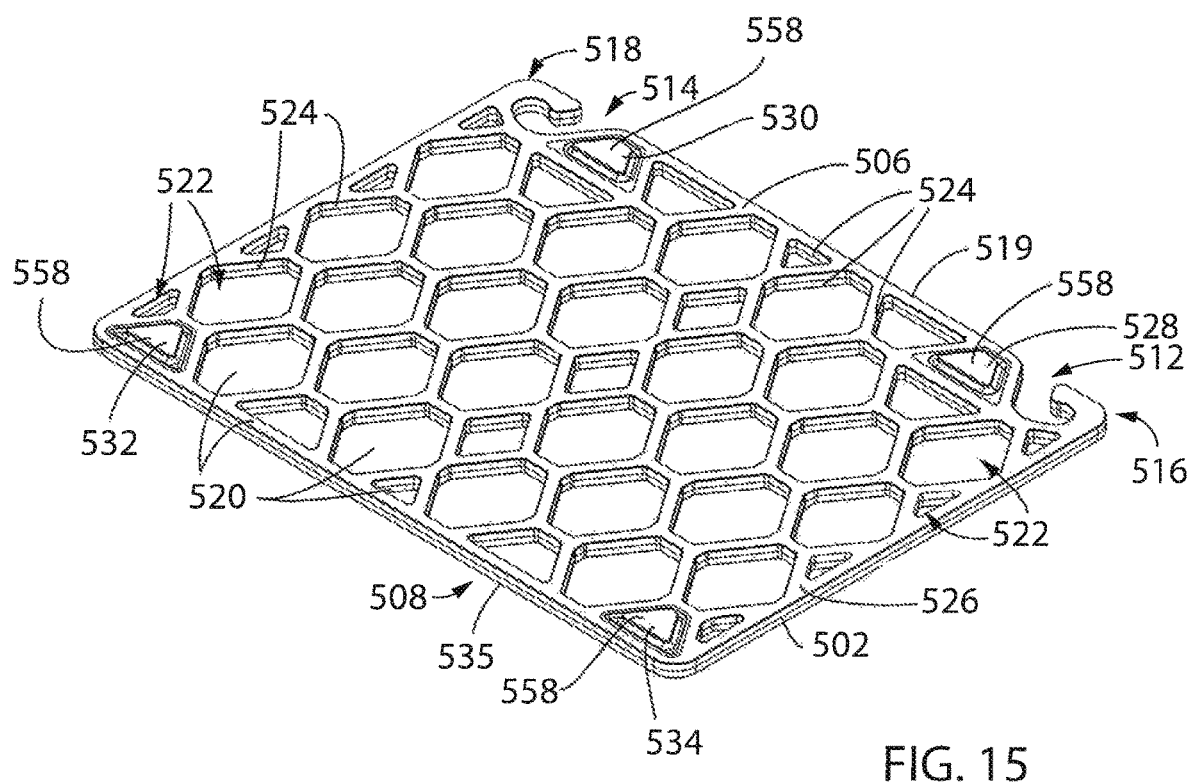
FIG. 15 is a perspective view of the base of the cutting board system of FIG. 14.
Figure 16:
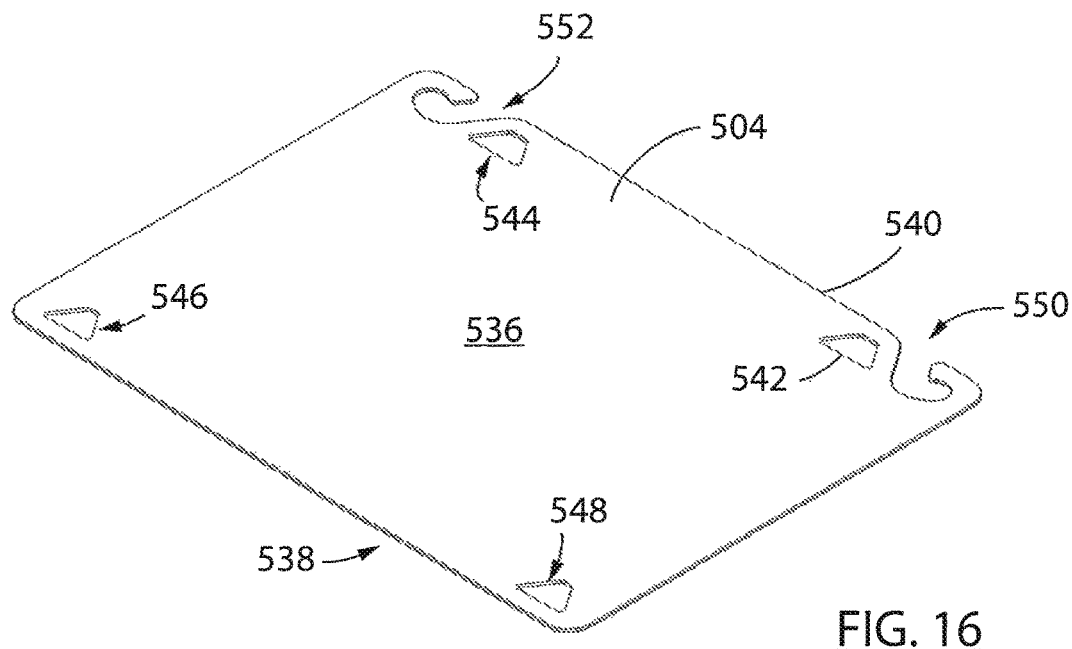
FIG. 16 is a perspective view of the removable cutting surface of the cutting board system of FIG. 14.

Unlike the solid base 102 of cutting system 100, the base 502 of cutting board system 502 may be generally formed of a honeycomb-like structure, shown in FIG. 15; where the base 502 is formed from a combination of multiple cells 520. Each cell 520 includes a void 522 defined within a wall 524. The walls 524 of adjacent cells 520 are contiguous so as to form a unitary body 526 of the base 502, having multiple voids 522 that extend from the first side 524 to the opposing second side 526. As shown in FIG. 15, the voids 522 may be generally polygonal, and of various size and shape, provided that the sides 524, 526 formed of the intermediate wall 524 provides sufficient integrity to support to overlying cutting surfaces 504 during use. It is further appreciated that other shapes and configurations of walls 524 and voids 522 are considered within the scope of this invention. It is appreciated that the honeycomb-like structure of base 502 provides a reduction in manufacturing material utilized in fabrication of the base 502 and a reduction in the weight of the base 502, which facilitates the user's ease of carrying the cutting board system 500.

Figure 17:
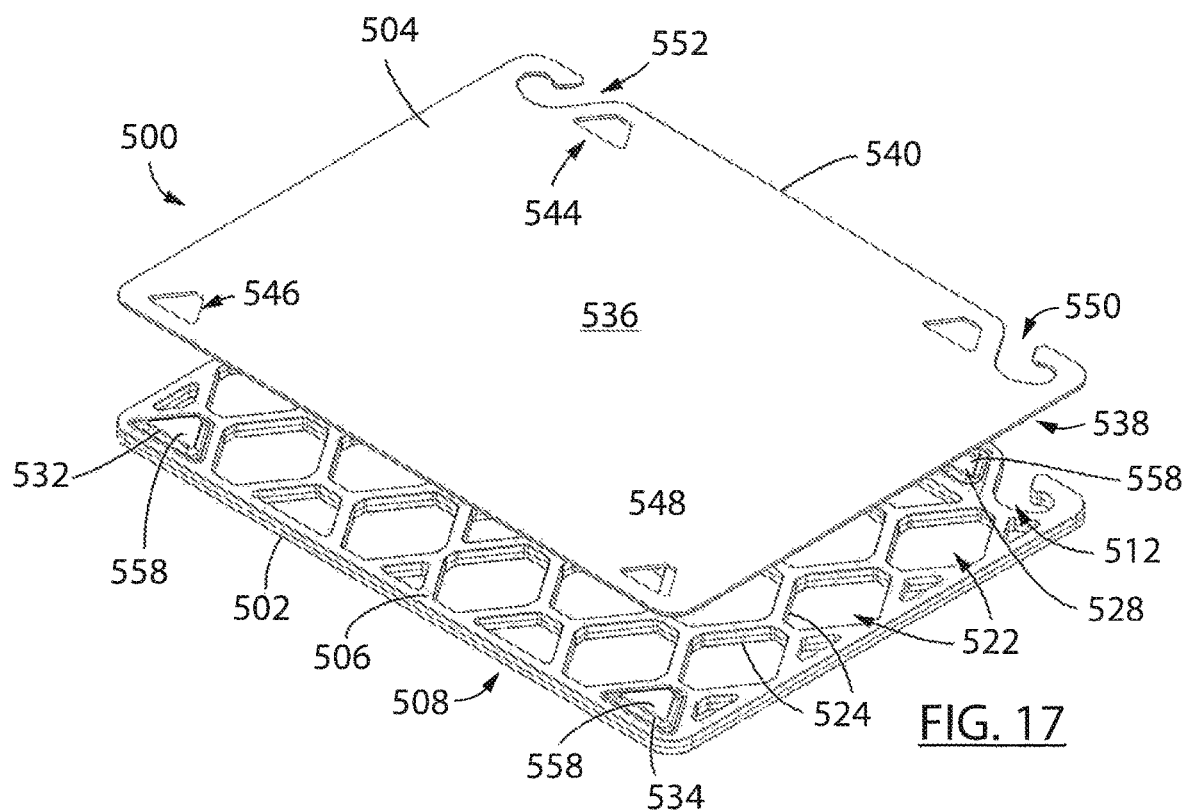
FIG. 17 is a perspective exploded view of the cutting board system of FIG. 14.

Base 502 further includes one or more projections 528, 530, 532, 534, where two projections 528, 530 are associated with the general position of the hooks 512, 514 along the longitudinal edge 519, and projections 532, 534 are associated with an opposite longitudinal edge 535 of base 502. Referring to FIG. 17, cutting surface 504 includes a working face 536 and an opposing base facing surface or face 538. Cutting surface 504 is generally defined by a perimeter 540 that includes one or more cutouts 542, 544, 546, 548 that are shaped to cooperate with respective projections 528, 530, 532, 534. Cutting surface 504 further includes cutouts 550, 552 that are formed in the perimeter 540 and shaped to cooperate with respective hooks 512, 514 when a respective cutting surface 504 is associated with base 502. The construction and orientation of hooks 512, 514 and projections 528, 530, 532, 534 associated with base 502 and cutouts 542, 544, 546, 548, 550, 552 associated with cutting surface 504 allow respective cutting surfaces 504 to be quickly indexed or positionally associated relative to base 502 for securing interaction therebetween when a discrete cutting surface 504 is engaged therewith.

In one embodiment of the present invention, shown in FIGS. 14-22, the projections 528, 530, 532, 534 associated with base 502 and cutouts 542, 544, 546, 548 associated with cutting surface 504 are shown to have a generally trapezoidal perimeter shape. However, alternative geometric shapes are considered within the scope of the present invention. Furthermore, as with cutting system 100, various geometric shapes of the projections 528, 530, 532, 534 and cutouts 542, 544, 546, 548 of cutting board system 500 may be utilized to specify particular categories of foodstuff, i.e., raw meat, seafood, poultry, produce, wheat, etc., that is to be associated with a given cutting board system 500. For example, generally trapezoidal projections 528, 530, 532, 534 and cutouts 542, 544, 546, 548 may identify a base 502 and cutting surface 504 that is to be used in the preparation of a first category of foodstuff, while generally circular projections (not shown) and corresponding cutouts (not shown) may identify a base 502 and cutting surface 504 that is to be used in the preparation of a second category of foodstuff. Use of such distinct geometries, locations, and/or orientations of projections 528, 530, 532, 534 and corresponding cutouts 542, 544, 546, 548 will further facilitate expedient indexing or positioning of the proper respective cutting surface 504 relative to a respective base 502, securing interaction therebetween, and aid in preventing cross-contamination or allergen exposure during food preparation. Moreover, the base 502 and cutting surfaces 504 may also be color coded, as was described above with respect to cutting systems 20, 100, to provide further visual indicia as to mitigate cross-contamination or allergen exposure during food preparation.

It should be appreciated that, like the cutting surfaces 204 of cutting system 200, the body 502 and the cutting surfaces 504 of cutting system 500 have a generally planar construction and a generally mirror construction, such that opposing sides 536, 538 of cutting surface 504 can be exposed and/or provide an exposed working face 554, 556 of the cutting system 500. Said in another way, cutting surfaces 504 cooperate with base 502 in a reversible manner such that each cutting surface provides two discrete working faces. It should further be appreciated that the opposite lateral sides of base 502 are generally mirror image constructions of one another such that a respective cutting surface 504 can be associated with either of the generally opposite lateral sides 506, 508 of base 502 such that cutting board system 500 is likewise flippable or otherwise reversible so as to concurrently provide multiple working faces.

Figures 18, 19:
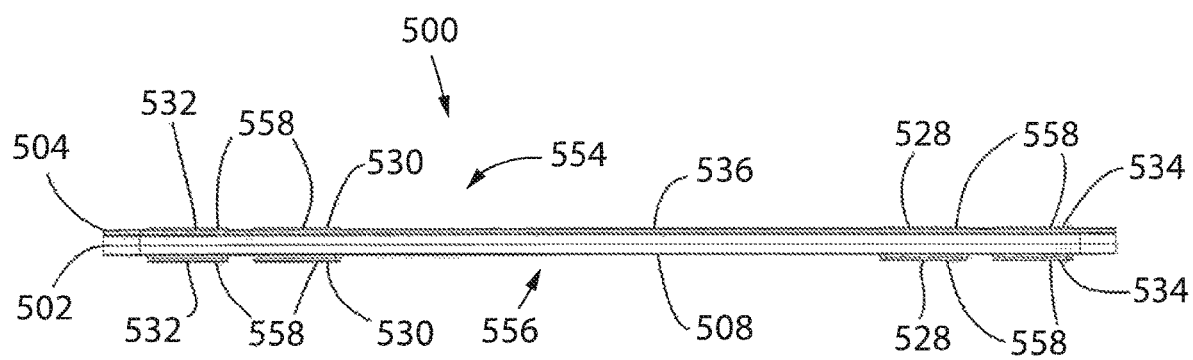
FIG. 18 is a first longitudinal side elevation view of the cutting board system of FIG. 14, showing a removable cutting surface on top of the base.
FIG. 19 is a top plan view of the removable cutting surface of the cutting board system of FIG. 14.
Figure 21:
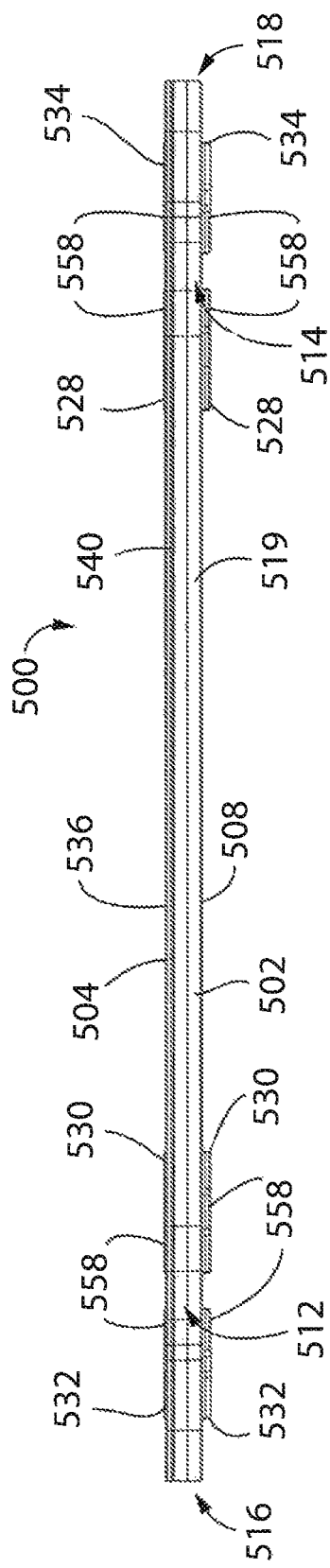
FIG. 21 is a second longitudinal side elevation view of the cutting board system of FIG. 14, showing a removable cutting surface on top of the base.
Figure 22:
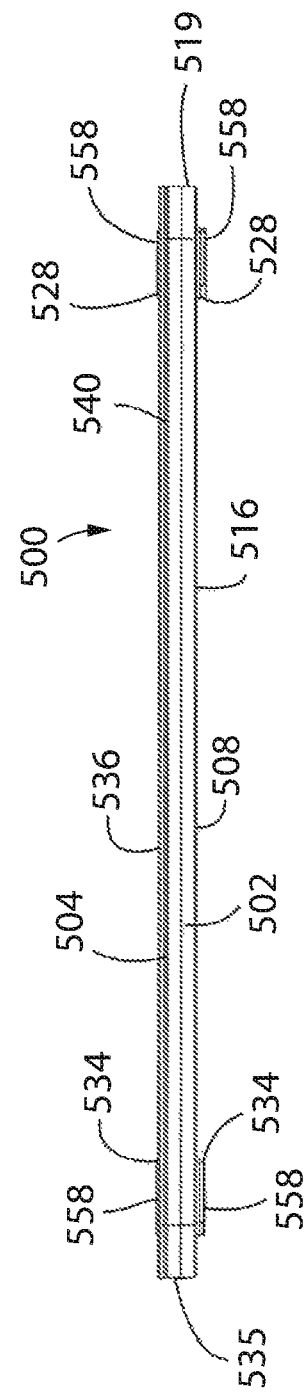
FIG. 22 is an edge side elevation view of the cutting board system of FIG. 14, showing a removable cutting surface on top of the base.
Figure 20:
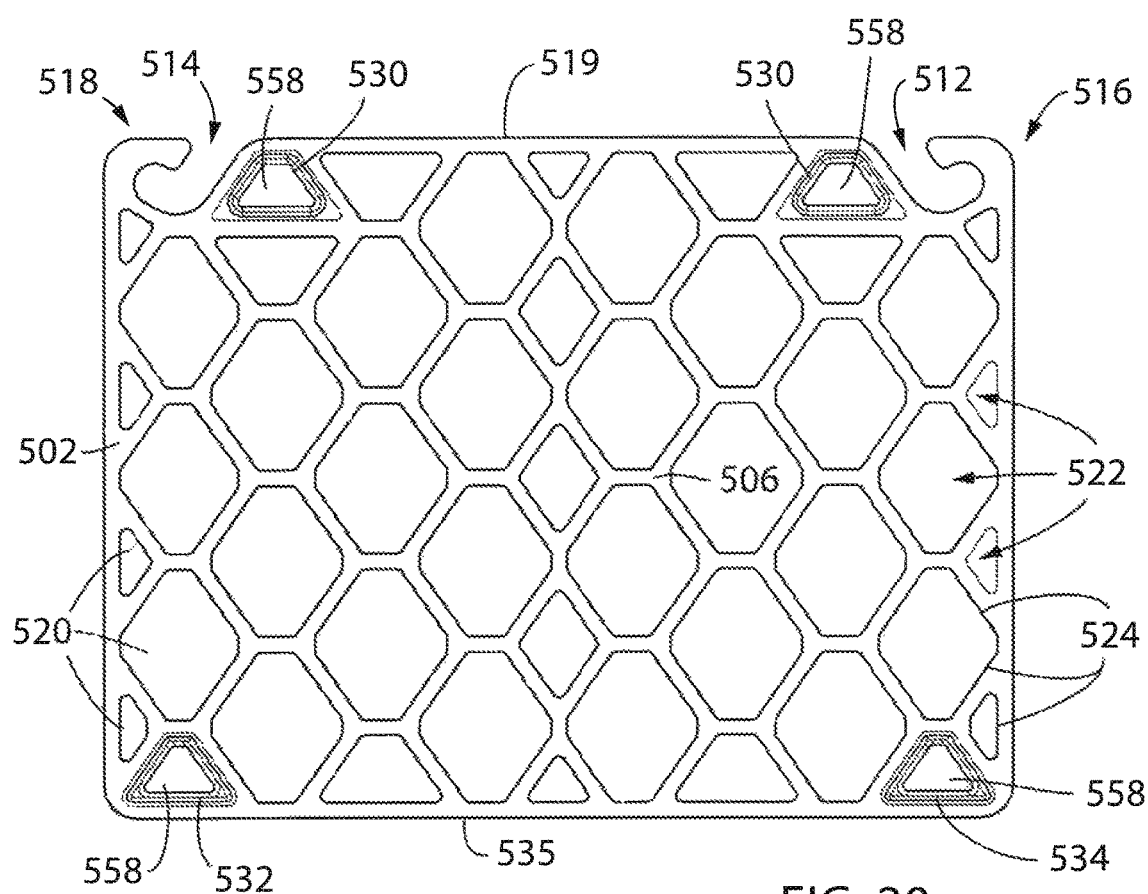
FIG. 20 is a top plan view of the base of the cutting board system of FIG. 14.

Referring now to FIGS. 14 and 17, respective edges of the projections 528, 530, 532, 534 of base 502 are contoured to snap fittingly cooperate and/or frictionally engage with the edges of cutouts 542, 544, 546, 548 of the cutting surfaces 104 when the respective cutting surfaces 504 are engaged with base 502. Moreover, the symmetrical configuration of the base 502 and cutting surface 504 provides a snap fittable interaction between the discrete cutting surfaces 504 and base 502 regardless of the respective work facing side 554, 556 associated with base 502 of cutting board system 500 to which a cutting surface 504 is secured. Referring to FIGS. 14 and 18, a support surface facing side 558 associated with each of projections 528, 530, 532, 534 preferably extends in a direction normal to the plane associated with the respective working faces of cutting surfaces 504 so as to be slightly proud of the respective working face 5360 associated with the discrete cutting surfaces 504 that are engaged with the respective alternate lateral sides of cutting board system 500.

Surfaces 558 are preferably constructed of slip limiting material, such as silicone and/or rubber type materials such that projections 528, 530, 532, 534 extend beyond the plane defined by the working face 536 associated with the discrete cutting surfaces 504 and thereby resist slippage of cutting board system 500 relative to a support surface, such as a counter surface, during use of either discrete working surface side of cutting board system 500 during cutting or food preparation processes or other uses of cutting board system 500.

It is further appreciated that cutting surfaces 504 of the cutting system 500 could be provided with the additional indicator functionality associated with the cutting board system 400 as disclosed above. That is to generally say that the cutting board system 500 may include cutting surfaces 504 formed of cut resistive but knife friendly material. Moreover, each cutting surface 504 may also include an indicator that is disposed generally beneath at least one working face 554, 556 associated with cutting surface 504, such that during use of cutting surface 504, cut marks that eventually penetrate a sufficient cut depth will reveal a visible indicator or indicia to the user of cutting board system 500. The appearance of the indicator or indicia during use of cutting surface 504 provides an indication that cutting surface 504, has degraded or been used to the point of desiring replacement in order to maintain the desired degree of sanitation associated with continued use of cutting surface 504.

Figure 23:
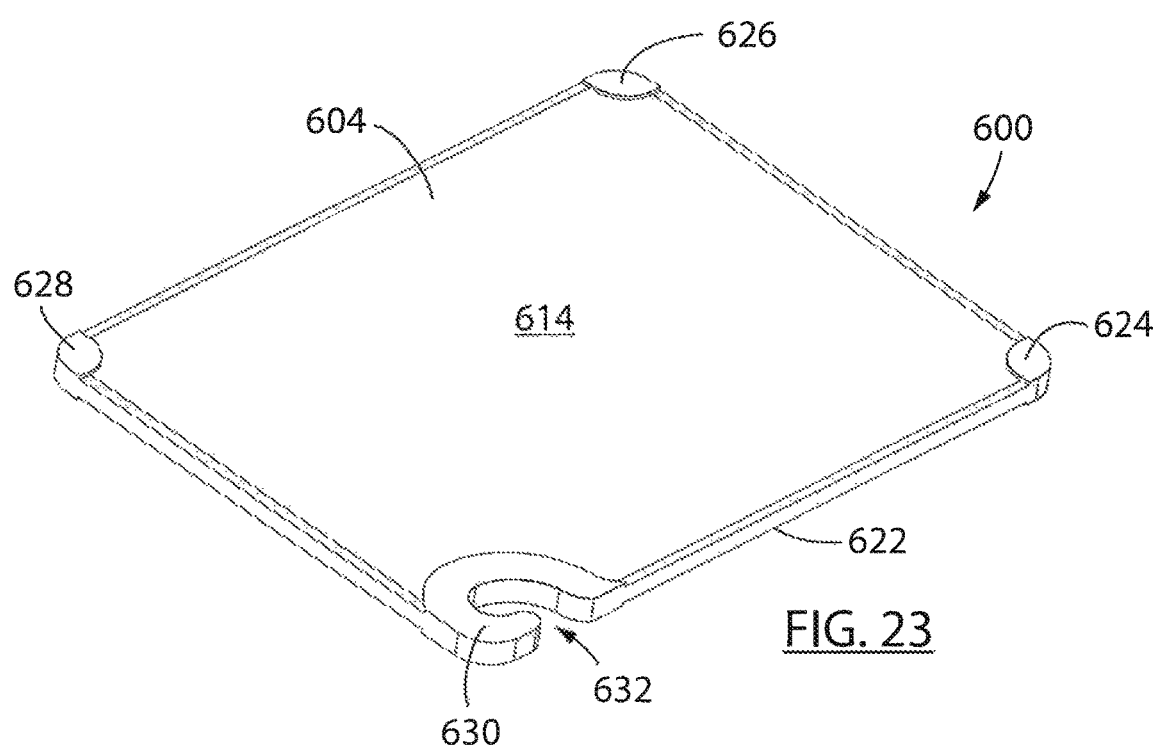
FIG. 23 is a perspective view of a cutting board system, in accordance with an alternative embodiment of the present invention, showing a cutting surface bordered by an over molded rim.
Figure 24:
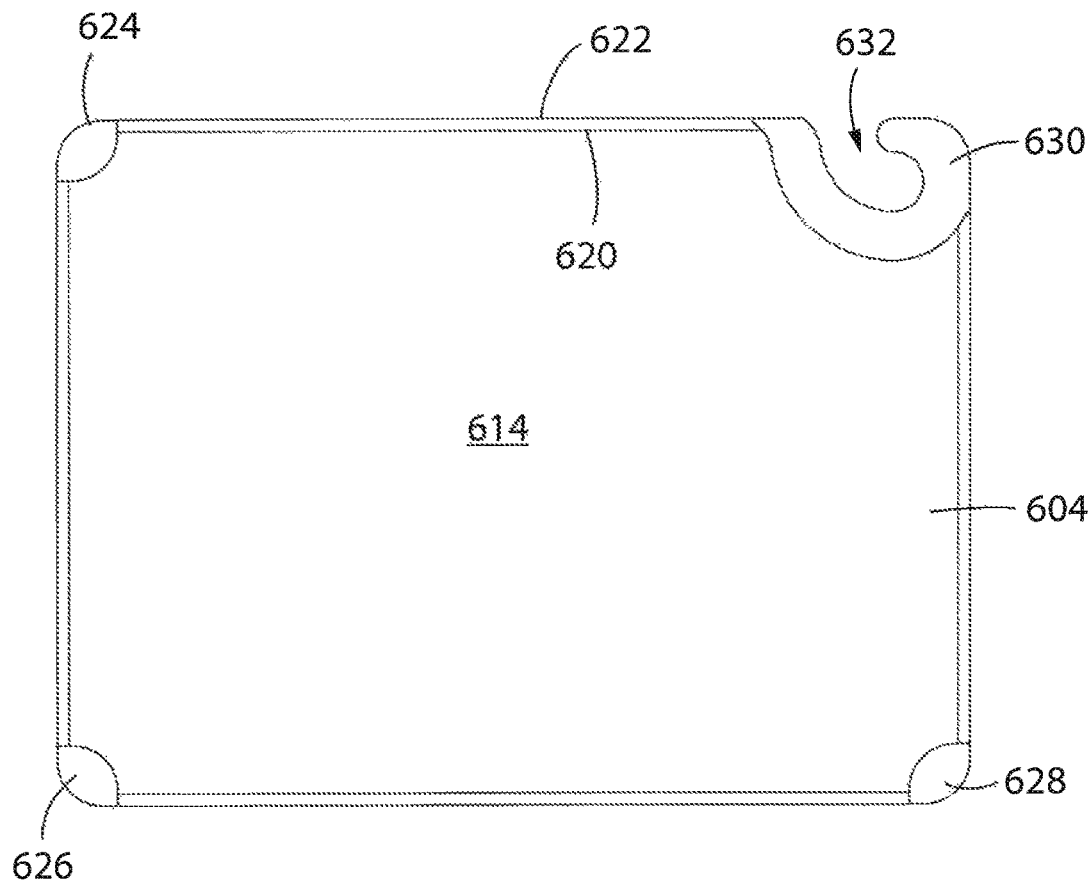
FIG. 24 is a top plan view of the cutting system of FIG. 21.
Figure 25:
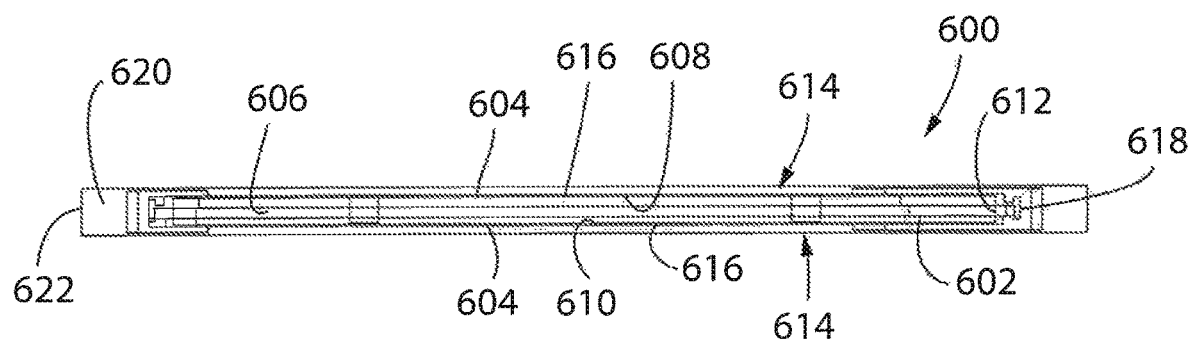
FIG. 25 is a cross-sectional side elevation view of the cutting system of FIG. 21.

FIGS. 23-25 show various views of a cutting board system 600 according to another embodiment of the invention. Cutting board system 600 includes an internal core or base 602 that is constructed to cooperate with opposing overlying cutting surfaces 604 wherein one or both of the base 602 and the cutting surface 604 are formed of a food-safe and cut resistive but knife friendly material. Base 602 includes a body 606 that is of a contrasting color to that of overlying cutting surfaces 604. The first surface 608 and an opposed second surface 610 of the body 606 are defined within a perimeter 612 of the body 602. A first cutting surface 604, includes a working face 614 and an opposing base facing surface or face 616, defined within a perimeter 618, which is configured to engage and enclose the perimeter 612 of the base 602 when the first cutting surface 604 receives the first surface 608 of the body at the base facing surface 616. As the base 602 and cutting surface 604 have a generally mirror image construction relative to their respective opposing surfaces, a second cutting surface 604 is similarly positioned about the opposite side of the cutting system 600, such that the second cutting surface 604 receives the second surface 610 of the body 606 at the base facing surface 616.

With the base 602 enclosed within the first and second cutting surfaces 604, which may be over molded thereon, outer collar 620 is dispose about the relative perimeters 612, 618 of the base 602 and cutting surfaces 604, respectively, as to define a perimeter 622 of the cutting board system 600. The collar 620 generally defined by a perimeter portion 622 includes a plurality of corner portions 624, 626, 628, and 630, wherein one or more discrete corner portions 630 defines a hook 632, as disclosed above in prior embodiments. Preferably, each corner portion 624, 626, 628, 630 is formed of a slip limiting material such as a rubber or silicone material.

In one embodiment, it is further appreciated that one or more of perimeter 622 and/or corner portions 624, 626, 628, 630 may be constructed to cooperate with cutting surface 604 such that a respective portion of perimeter 620, and/or respective corner portions 624, 626, 628, 630, extend in a lateral direction generally normal to the working face associated with cutting surfaces 604 so as to be proud of or extend beyond the plane defined by the discrete cutting surfaces 604 to support cutting board system 600 during use of the same. In one embodiment, the collar 620 may be formed of a resilient material as to be removable, such that the first and/or second cutting surfaces 604 may be replaced when worn, and the collar 620 may then be replaced in its original position about the cutting board system 600 that includes replacement cutting surfaces 604. Like cutting board systems 100, 200, 300, 400, 500, cutting board system 600 may also provide cutting surfaces 604 or a collar 620 that are color coded for use with particular foodstuffs, as to prevent cross contamination during food preparation.

It is further appreciated that the cutting system 600 could be provided with indicator functionality as described above in cutting systems 400, 500. That is to say that the base 602 of the cutting system 600 defines the indicator, as disclosed above, and is of a visually distinct color from the cutting surfaces 604 of the cutting system 600. The cutting board system 600 may include cutting surfaces 604 formed of cut resistive but knife friendly material. Moreover, during use of cutting surface 604, cut marks that eventually penetrate a sufficient cut depth of the cutting surface 604 will reveal the base 602, i.e., visible indicator, to the user of cutting board system 600. The appearance of base 602 during use of cutting surface 604 provides an indication that cutting surface 604 has degraded or been used to the point of requiring replacement in order to maintain the desired degree of sanitation associated with continued use of cutting surface 604.

Further, the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

What is claimed is:

1. A cutting board system comprising:
A reversible and unitary cutting surface constructed of a cutlery friendly material, the cutting surface comprising:
a degradation indicator; and
a working face affixed to and disposed over the degradation indicator, wherein the working face is visually distinct from the degradation indicator and inseparable therefrom.

2. The cutting board system of claim 1 having a first configuration wherein the working face has a first thickness that is sufficient to cover the degradation indicator from view of a user; and,
a second configuration wherein the working face has been degraded to a second thickness that is less than the first thickness and the degradation indicator is at least partially visible to the view of the user.

3. The cutting board system of claim 2 wherein the first thickness is greater than 0.0325 millimeters.

4. The cutting board system of claim 1 wherein the working face is a first working face that is disposed over a first side of the degradation indicator.

5. The cutting board system of claim 4 wherein the cutting surface further comprises a second working face that is disposed about an opposing second side of the degradation indicator.

6. The cutting board system of claim 1 wherein the degradation indicator has a surface area substantially equal to an area of the working face.

7. The cutting board system of claim 1 wherein the working face is a first color and the degradation indicator is a second color that is different from the first color.

8. The cutting board system of claim 1 wherein the cutting surface is shaped to cooperate with a base portion such that the cutting surface overlies a majority of the base portion.

9. The cutting board system of claim 8 wherein the base portion includes at least one supporting projection extending outwardly from the base portion to a height proud of a work face of the cutting surface when the cutting surface cooperates with the base portion.

10. The cutting board system of claim 8 wherein at least one of the base portion and the cutting surface defines a hook configured to suspend the cutting board system in a generally vertical orientation.

11. The cutting board system of claim 8 wherein the base portion includes a first side configured to removably cooperate with the cutting surface and a second side configured to removably cooperate with another cutting surface having a shape similar to the cutting surface.

12. The cutting board system of claim 8 wherein the base portion includes at least one indexer that is oriented laterally inboard of a perimeter of the base portion and that extends through the cutting surface and orients the cutting surface relative to the base portion when the cutting surface is secured thereto.

13. A cutting board system comprising:
   a base portion;
   a unitary cutting surface constructed of a cutlery friendly material that is configured to overlay a majority of the base portion, the cutting surface comprising:
      a degradation indicator; and
      a working face affixed to and disposed over the degradation indicator, wherein the working face is visually distinct from the degradation indicator and inseparable from the degradation indicator aside from degradation of the working face.

14. The cutting board system of claim 13 having a first configuration wherein the working face has a first thickness that is sufficient to obscure the degradation indicator from view of a user; and,
   a second configuration wherein the working face has been degraded to a second thickness that is less than the first thickness and the degradation indicator is at least partially visible to the view of the user.

15. The cutting board system of claim 13 wherein the working face is a first color and the degradation indicator is a second color that is different from the first color.

16. The cutting board system of claim 13 wherein the working face is a first working face that is disposed over a first side of the degradation indicator; and wherein the cutting surface further comprises a second working face that is disposed about an opposing second side of the degradation indicator.

17. The cutting board system of claim 13, wherein the base potion includes at least one supporting projection extending outwardly from the base portion to a height proud of a work face of the cutting surface when the cutting surface cooperates with the base portion.

18. The cutting board system of claim 13 wherein at least one of the base portion and the cutting surface defines a hook configured to suspend the cutting board system in a generally vertical orientation.

19. The cutting board system of claim 13 wherein the base portion includes a first side configured to removably cooperate with the cutting surface and a second side configured to removably cooperate with another cutting surface having a shape similar to the cutting surface.

20. The cutting board system of claim 13 wherein the base portion includes at least one indexer that is oriented laterally inboard of a perimeter of the base portion and that extends through the cutting surface and orients the cutting surface relative to the base portion when the cutting surface is secured thereto.

21. A method of forming a cutting board, the method comprising:
   providing a base portion;
   providing a unitary substantially planar cutting surface that is constructed of a cutlery friendly material and shaped to overlay a majority of the base portion and wherein the cutting surface includes a use layer that is exposed during use of the cutting surface and an indicator layer that is affixed to and disposed beneath the use layer.

22. A cutting board system comprising:
   a base portion; and
   a reversible and unitary cutting surface constructed of a cutlery friendly material affixed to and disposed above an indicator layer that is integrally formed with the reversible and unitary cutting surface, the reversible and unitary cutting surface being shaped to removably cooperate with the base portion such that the cutting surface overlies at least a majority of the base portion and is tool-lessly securable relative thereto and is replaceable with other cutting surfaces having a similar shape as the cutting surface.

* * * * *